United States Patent [19]
Lichtfuss

[11] Patent Number: 4,984,625
[45] Date of Patent: Jan. 15, 1991

[54] DEMISTING SCREEN ARRANGEMENT FOR TWO-PHASE THERMAL MANAGEMENT SYSTEM

[75] Inventor: Gerhardt E. Lichtfuss, Rockford, Ill.

[73] Assignee: Sundstrand Corporation, Rockford, Ill.

[21] Appl. No.: 268,884

[22] Filed: Nov. 8, 1988

[51] Int. Cl.$^5$ .............................................. F28D 15/02
[52] U.S. Cl. .................. 165/104.25; 55/159; 55/185; 55/400; 244/163; 165/41; 165/111
[58] Field of Search .................. 165/104.25, 41, 86, 165/111; 55/159, 185, 400; 244/163

[56] References Cited
U.S. PATENT DOCUMENTS

| | | | |
|---|---|---|---|
| 4,266,829 | 5/1981 | Divers | 55/400 |
| 4,313,992 | 2/1982 | Spiewok | |
| 4,603,732 | 8/1986 | Niggemann | 165/41 |

Primary Examiner—Albert W. Davis, Jr.
Attorney, Agent, or Firm—Antonelli, Terry, Stout & Kraus

[57] ABSTRACT

An improved demisting screen arrangement utilized in a rotary fluid management device (13) of a two-phase thermal management system (1) employs a multi-layered annular screen (34) held in a casing (52) to define a space (54) on the downstream side of the screen (34). The arrangement provides a lower pressure drop across the screen which results in wet vapor passing through the screen (34) at a lower velocity and in thereby preventing the vapor from passing through only a localized section near the inner diameter of the annular screen (34) in the region of the hub (56). This arrangement effectively increase the volume of the screen (34) through which the wet vapor is now caused to flow and, therefore, increases the amount of liquid phase separated from the vapor phase.

14 Claims, 4 Drawing Sheets

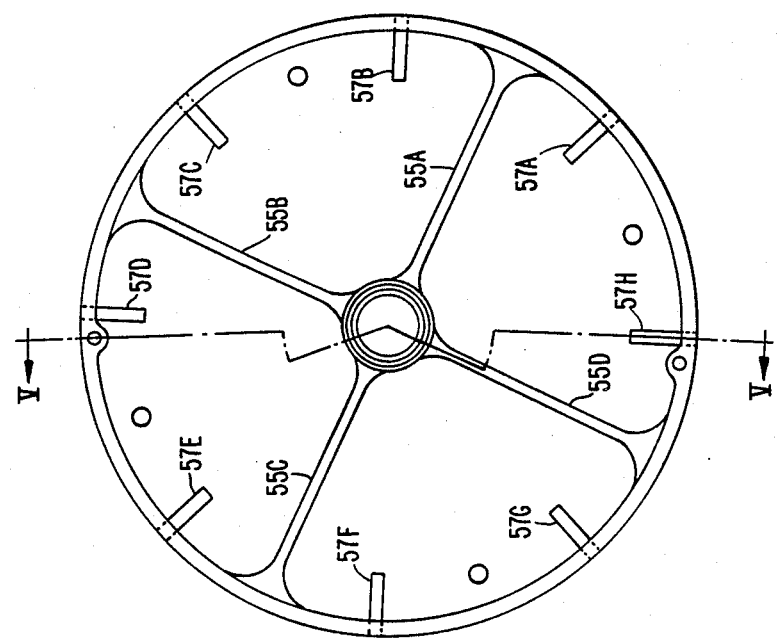
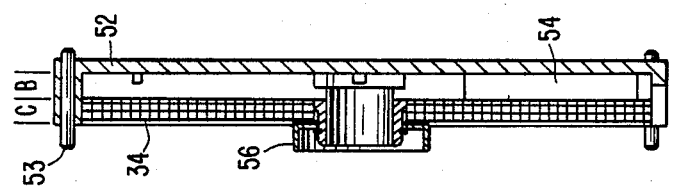

DEMISTING SCREEN ARRANGEMENT FOR TWO-PHASE THERMAL MANAGEMENT SYSTEM

DESCRIPTION

1. Technical Field

The present invention relates to a demisting screen used in two-phase flow. More particularly, the present invention pertains to a demisting screen which offers a greater surface area for collecting fluid droplets in a rotary fluid management device (RFMD) used in a two-phase thermal management system (TPTMS) useful in manned spacecraft and space platforms for maintaining a desired temperature level, rejecting human heat and preventing heat reduction.

2. Background Art

Up until fairly recently, thermal management in manned spacecraft has relied exclusively on mechanically pumped liquid systems to collect, transport and reject waste heat through a space radiator. The Space Shuttle Orbiter Freon 21 is such a circuit and has performed with excellent reliability.

However, with an increasing focus on multi-year missions such as the Space Station, the limitations of mechanically pumped liquid systems have become more apparent. For instance, a thermal management system for the Space Station must be capable of functioning on missions exceeding ten years and of dissipating large quantities of waste heat. The system must operate with large distances between heat sources and heat sinks, in addition to a variety of payloads and heat sources which can be reconfigured by the crew as mission objective dictate. It must also have an adequate turn down capability, i.e. the ability to respond rapidly to considerable reductions in the heat load at the evaporator.

The concept of a "thermal bus" meets many of the foregoing objectives because, in a manner similar to an electrical bus, loads and sources of various sizes and number can be attached and cycled without significant effect on the bus. It also provides minimal variation in temperature and allows either heat sources or sinks to be connected to any location with minimum constraints. Such a thermal bus can take the form of a two-phase fluid loop wherein heat is transferred by evaporation and condensation to maintain more nearly constant temperatures than can be obtained with sensible heating and cooling of the fluid as is the case with mechanically pump fluids which are heated and cooled. In addition, the evaporation process requires much lower mass flows than mechanically pumped liquids which are heated and cooled, thereby achieving significant savings in pumping power and weight. One such two-phase heat management system is disclosed in U.S. Pat. No. 4,603,732.

Sundstrand Corporation the assignee of this application, has developed the TPTMS to serve as the thermal bus in the Space Station and other space applications where zero-gravity will be encountered. This system schematically shown in FIG. 1 can use a heat exchange fluid such as ammonia ($NH_3$) and pitot pumps in a rotary drum of the rotary fluid management device (RFMD) to preclude cavitation problems that would otherwise occur with known centrifugal pumps which might be used in a zero-gravity two-phase fluid loop system. A back-pressure regulator maintains a constant saturation pressure in the RFMD so that a constant evaporator temperature can be maintained independently of the mass flow. A recirculating loop returns subcooled condenser outlet flow to the condenser inlet. A detailed description of the operation of the TPTMS and the RFMD used therein is not deemed necessary inasmuch as its general operation is now well known and would not serve to highlight the present invention.

For present purposes it is sufficient to note that fluid management of the two-phase flow in the TPTMS requires controlled separation of liquid and vapor during thermal cycling of the fluid as it circulates among the evaporators which typically receive a variable heat load, the RFMD and the condenser where the heat is dissipated by radiation or the like. Separation of the two-phase fluid requires the use of a rotating drum having two rotating demisting screens, with one double screen arrangement located at the inlet of an evaporator section of the RFMD and another double screen arrangement at the downstream outlet of that section which is adjacent the condenser section for removing liquid from a wet vapor. Previous attempts to provide this controlled separation included the use of an annular demisting screen comprised of an open cell aluminum foam or, alternatively, of a multi-layered screen that was essentially dead headed at the outlet of the dry vapor screen between the evaporator and condenser sections except at the inside diameter of the screen.

Screens used in centrifuging processes in general have been long known as shown, for example, in U.S. Pat. No. 4,313,992. However, these screens are not intended or useful for use in an RFMD for a demisting operation. The cited patent shows one embodiment in which a centrifuging screen for a thrust-type centrifuge comprises screen bars of a sintered hard material extending axially of the centrifuge drum and resting throughout their length by being connected to a supporting frame via an adhesive. The supporting frame is formed by a perforated metal plate with the center of the perforation being located in the gaps between the bars. Another disclosed embodiment uses a supporting frame of wire mesh fabric or a grid or grating. Although this patent does not disclose the precise materials being centrifuged, such screens appear to be primarily useful for separating suspended solid materials from a liquid of different density where solid fragments can otherwise drop into spaces between transverse members and render the screen otherwise unsuitable for use. The aforementioned centrifuge screen is not useful in a demisting operation in an RFMD because the patented screen is axially rather than radially arranged so that it is impossible to retain liquid at a desired level around the periphery of the drum with the remaining dry vapor passing axially for further treatment and separation.

A typical construction of a multiple layer demisting screen more recently developed for an RFMD application consists of predetermined mesh size single screens with each layer screen oriented radially 45° to each adjacent layer screen and then diffusion bonded to a desired thickness so that a unitary screen assembly is achieved. Stainless steel is an acceptable screen material in a RFMD, but other types of metal screens may also be used depending upon the fluid medium used in the system. Diffusion bonded screens are commercially available and can be diametrically sized by the end user.

These multi-layered demisting screens, both at the inlet and outlet of the evaporator section, are intended to collect fluid droplets in the wet vapor returning from the evaporators to the RFMD by directing the wet vapor through the action of centrifugal force radially through the screens to the peripheral inner wall of the rotating drum so that the fluid in a liquid phase at saturation, i.e. the boiling point for the system pressure, can be pumped by pitot pumps to the evaporators for recycling. If any wet vapor remains after passing through the inlet screen, it passes through the evaporator section and is intended to complete demisting at the outlet screen with the dry vapor issuing from the outlet screen being directed through the center of the stationary shaft to the condenser for mixing and conditioning with subcooled fluid from the condenser section of the RFMD.

Previously proposed arrangements for an RFMD utilized two annularly shaped multi-layered screens at the inlet of its evaporator section and also two multi-layered screens at the outlet of that section where the latter was dead headed except at the inner diameter. However, with such an arrangement, I have found that the pressure drop across the outlet screen is inappropriate and the velocity of the still wet vapor too high to permit maximum use of the surface area of the screen to effect the demisting operation before the vapor passes into the center of the shaft where it is supplied to the condenser via a pressure regulator and mixer. Consequently, the efficiency with which the rotary drum separates the two-phase flow by action of centrifugal force and with which the pitot pump system collects the noncondensible gases is lowered so that the overall operation of the TPTMS is adversely affected as well.

DISCLOSURE OF INVENTION

The foregoing problems have been overcome by the provision at the outlet of the RFMD evaporator section of a single multi-layer screen in a casing.

An object of the present invention is to provide a screen of a certain axial thickness which in relation to its casing defines a space of substantially similar thickness between an axial end face of the screen and an axial end face of the casing to create a pressure drop across the screen adequate to prevent wet vapor entering the screen on the evaporator section side from passing through the screen only in the region around a center shaft of the RFMD.

Another object of the present invention is to provide a demisting screen in a casing arranged to cause the wet vapor passing through the screen to travel radially so that the effective surface area of the screen is increased and as much fluid as possible is removed by centrifugal force from the vapor before the vapor is transmitted into the condenser.

BRIEF DESCRIPTION OF THE DRAWINGS

These and further features, objects and advantages will become more apparent from the following description when taken in conjunction with the accompanying drawings wherein:

FIG. 4 is an elevational view of the screen casing; and

FIG. 5 is a cross-sectional view taken along line V—V of FIG. 4 showing the screen and casing.

BEST MODE FOR CARRYING OUT THE INVENTION

I incorporate by reference herein U.S. Pat. No. 4,603,732 which discloses the operation of an RFMD of the general type used in the TPTMS. For the sake of conciseness, familiarity with two-phase thermal systems and the use of the RFMD in those systems by those skilled in heat management systems will be assumed.

Figure 1:
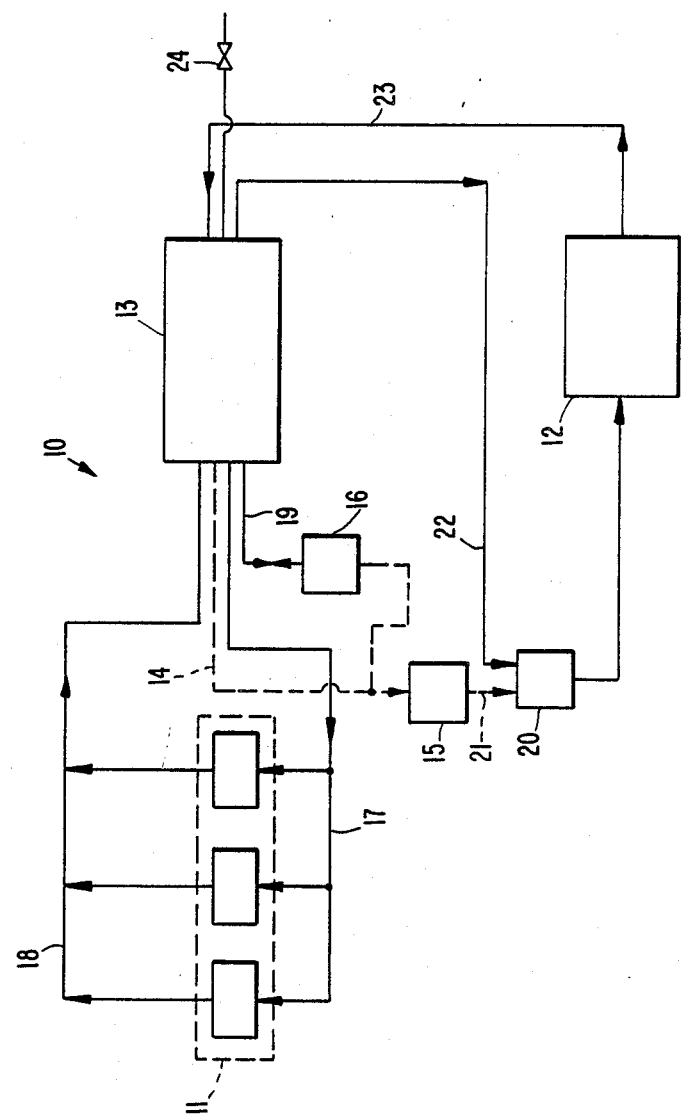
FIG. 1 is a schematic representation of the two-phase thermal management system (TPTMS) which utilizes the demisting screen of the present invention.

However, to put the present invention in some context, FIG. 1 shows a typical TPTMS designated generally by the numeral 10 in which one or more evaporators, shown in dashed line designated by the numeral 11, are associated with one or more variable heat loads and a condensing heat exchanger 12 radiates heat out of the system. An RFMD 13 is provided between the evaporators 11 and the condenser 12 to effect management or stabilization of the two-phase flow. The RFMD uses a rotating drum (hereinafter described in more detail with reference to FIG. 2) which produces a centrifugal force on the vapor and liquid which separates the much denser liquid phase from the vapor phase of the system fluid and stores the former in a annulus around the inner periphery of the rotating drum by virtue of the centrifugal force, with the vapor occupying the ullage between the RFMD center shaft and the radially inner surface or interface of the liquid phase. The RFMD establishes equilibrium between the vapor and liquid phases at substantially the desired sink temperature of the evaporator(s) 11.

In theory, dry vapor separated from the liquid phase in the RFMD 13 is supplied by a line 14 to a pressure regulator 15 and to one side of an accumulator 16 such as a bellows accumulator. The separated saturated liquid phase in the RFMD 13 is supplied via a line 17 to the evaporator(s) 11 and is used to maintain a level temperature from one or more variable heat loads. The greater the amount of heat load the greater the amount of vaporization. However, it is not intended that all of the liquid will be evaporated because superheating of the vapor may otherwise occur. The system pressure is maintained constant so that the sink temperature at the variable heat load may be made constant and equal to the liquid boiling point. After evaporation process occurs, the liquid is now in the form of a wet vapor which is in equilibrium, i.e. saturation, which is returned via a line 18 to the RFMD 13 where the separation of the liquid and vapor phases again occurs. It should be understood that the evaporator(s) 11 can also supply heat if the source is below a desired temperature.

A level control tube (see numeral 48 in FIG. 2) is connected with the other side of the accumulator 16 via a line 19 so that a constant pressure can be maintained within the RFMD 13. Whenever the pressure within the RFMD 13 exceeds the desired system pressure which controls the saturation pressure at which the liquid phase fluid is provided to the evaporator(s) 11, the pressure regulator 15 vents excess pressure. However, the accumulator 16 tends to dampen any slight increases or decreases in RFMD pressure.

The pressure regulated dry vapor is then supplied to a mixer 20 via a line 21 where it is mixed with recirculating liquid phase flow from a condenser side of the RFMD 13 via a line 22 to form a two-phase flow which is supplied to the condenser 12 where the heat is exchanged and the vapor condensed to form a subcooled liquid phase which is returned to the RFMD 13 via a line 23. The condenser must thus be capable of condensing gaseous phase flow as well as liquid phase fluid. A gas vent 24 is provided to exhaust non-condensible vapor to avoid an undesired build up of pressure in the condenser section of the RFMD 13 where the fluid is at a temperature below saturation.

Figure 2:
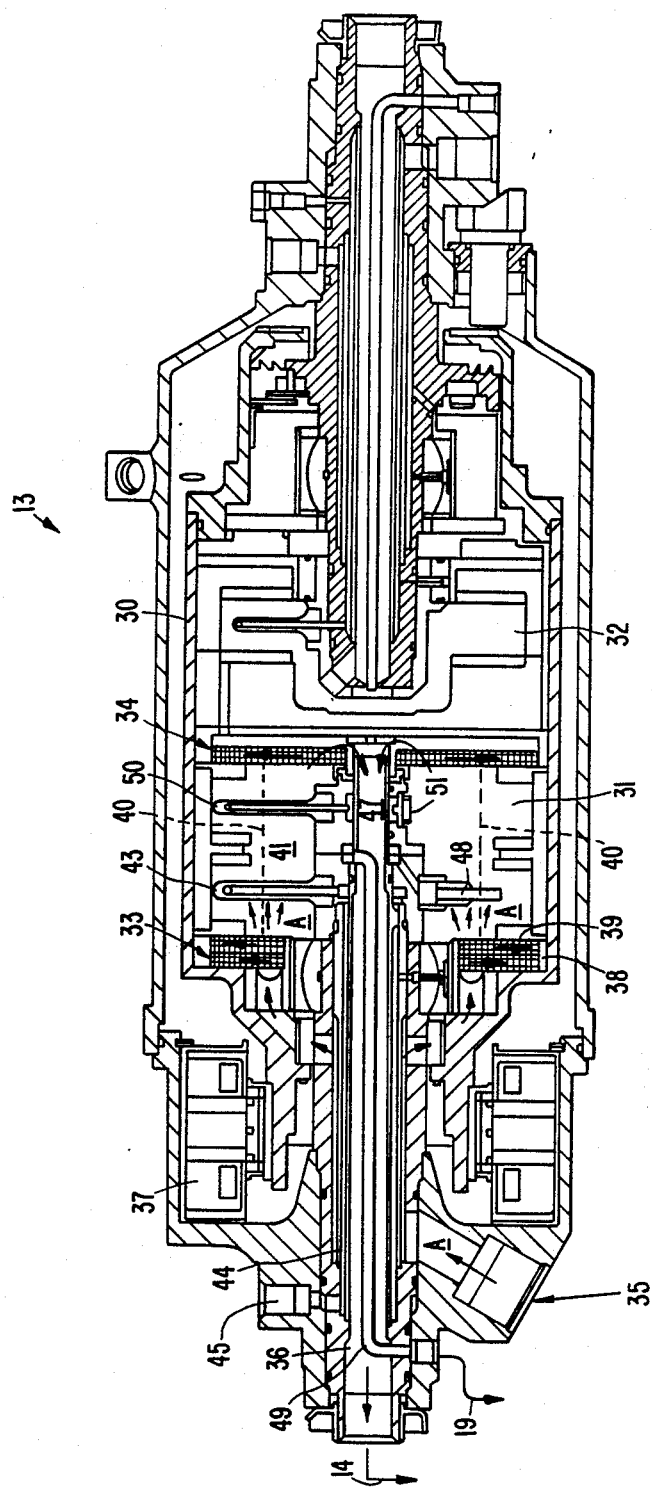
FIG. 2 is a detailed cross-sectional view of the rotary fluid management device (RFMD) used in the TPTMS of FIG. 1.
Figure 3:
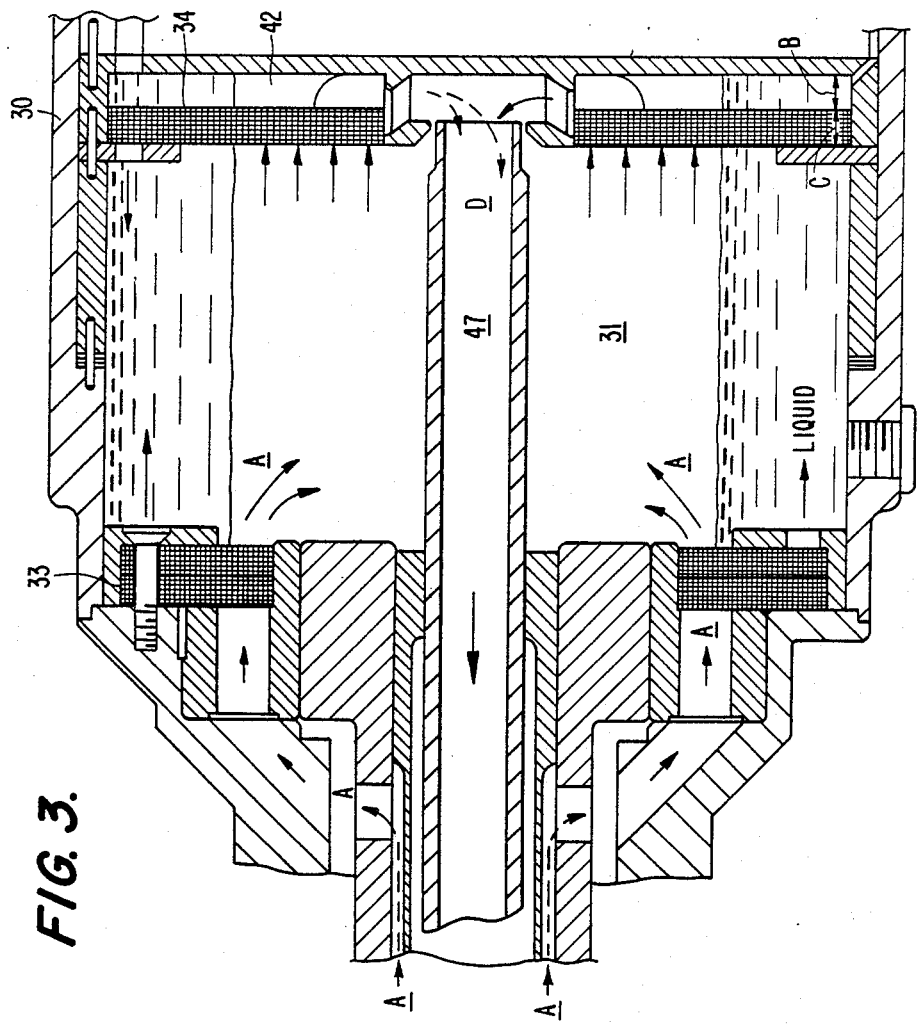
FIG. 3 is a schematic view of the evaporator section of the RFMD of FIG. 2 without certain constructional details such as pitot pumps.

FIGS. 2 and 3 depict in greater detail the parts of the RFMD 13. A drum 30 is suitably mounted for rotation at about 3000 rpm by a motor unit 37 in a known manner so as to provide both centrifugal separation and pumping in zero gravity conditions. The interior of the drum is divided into two sections, an evaporator section 31 and a condenser section 32 downstream of the evaporator section 31 and viewed in the direction of wet vapor flow into the evaporator section. A screen 33 rotating with the drum is provided at the inlet of the evaporator section 31 and comprises two multi-layered sections adjacent each other. Another screen 34 rotating with the drum is located at the outlet of the evaporator section 31 and will be discussed in greater detail with reference to FIGS. 3-5. Equilibrium is established between the liquid and vapor phases in the evaporator section 31.

As previously described with regard to FIG. 1, two-phase flow in the form of saturated wet vapor from the evaporator(s) 11 associated with one or more variable heat loads is transmitted to the evaporator section 31 of the RFMD 13 through a line 18 to a port 35 in the casing of the RFMD 13 which is then supplied through a stationary central shaft 36. The wet vapor flows in the direction indicated by arrows A in FIGS. 2 and 3 and passes through the dual multi-layer screen 33 at the inlet of the evaporator section 31. In passing through the double screen 33 at relatively high velocity, much but not all of the liquid phase in the wet vapor is caused to attach itself to the screen 33, allowing a drier vapor to pass into the evaporator section 31. The liquid on the rotating screen 33 is caused by centrifugal force to travel radially outward toward the inner wall of the drum 30 and to accumulate in the evaporator section 31 via axial passages 38 in a conventional casing 39 which prevents the screen 33 from movement relative to the rotating drum 30. The liquid phase builds up in the evaporator section 31 and defines a level or interface designated by dashed lines 40 in the form of an annulus. The ullage 41 between the liquid phase level 40 and the stationary shaft 36 contains a drier vapor than the wet vapor prior to passing through the inlet screen 33.

In order to obtain the desired level of dryness of the vapor which is necessary for proper pressure regulation, it is necessary to pass it through an outlet screen 34. To this end, I have discovered that there will be an improvement in the drying ability of the screen 34 if dead heading of the screen at the outlet, except at an inside diameter, is avoided altogether and instead the velocity of the vapor is decreased to achieve a pressure drop which will effect the use of greater portion of the screen volume for demisting. This can be achieved with a single multi-layer screen 34 as shown in FIG. 5 having a cavity of similar thickness bounded by a casing wall downstream thereof to achieve the appropriate pressure drop and reduction of vapor velocity which will prevent wet vapor from being forced into the dry vapor passage 47.

In the evaporator section shown in FIG. 2 but not shown in FIG. 3 for the sake of clarity, an adjustable pitot static head 48 acts as a level control device to provide pressure to the accumulator 16 through a central aperture 49 in shaft 36 and through line 19. Another pitot tube 50 pumps liquid through nozzles 51 disposed around the shaft 36 in the event subcooled liquid phase fluid enters the evaporator section 31 disturbing equilibrium conditions therein.

In the presently preferred embodiment of the screen and cavity shown in FIGS. 4 and 5, the cavity thickness B is of approximately the same thickness B as the thickness C of the screen 34. As a result, the vapor emerging from the outlet and passing into the center of shaft 36 as indicated by the arrows D will be of the desired dryness for supplying to the pressure regulator 15 and thereafter to the condenser 12. The liquid phase in the form of mist will now be collected over a larger volume of the screen 34, thereby returning more liquid phase to the annulus in the evaporator section 15 of the rotating drum 30 where it will be pumped by ram-like induction of a pitot tube 43 via an annular channel 44 around the shaft 36 to a port 45 in the casing of the RFMD 13 and thereafter to the evaporator(s) 11. This liquid is subcooled with respect to the vapor in the evaporator section 31 only by virtue of the pump pressure use caused by the pitot tube 43. A detailed description of the operation of the condenser section 32, beyond that already provided, is not necessary to a complete understanding of the present invention inasmuch as the present invention is concerned with the arrangement of the outlet screen 34 in the evaporator section 31.

The important aspect is that only a single multi-layer screen 34 is mounted as shown in FIG. 4 in a shallow casing 52 where it is held by headless straight pins disposed around the periphery of the casing 52. A space 54 is defined between the opposed axial faces of the screen 34 and casing 52 which in the present embodiment is approximately the same as the axial thickness of the screen 34. This arrangement provides a reduced pressure drop from the inlet to the outlet side of the screen 34 with a resultant decrease in velocity of the vapor entering the screen 34. The casing 52 can also be provided with radial ribs 55A to 55D which provide axial support and radial slots 57A-57H which provide communication for the return flow of liquid phase between the condenser section 32 and the evaporator section 31.

A hub 56 is provided centrally of the screen 34 and is adapted to sealingly mate with a beaded portion extending axially from the body of the pitot pump 50 to separate the wet vapor space 41 from the dry vapor passage 47 defined by the hollow interior of shaft 36.

While I have shown and described a presently preferred embodiment in accordance with the present invention, it is not intended that this application be so limited since changes and modifications will be apparent to one skilled in the art with knowledge of the above described embodiment. Therefore, I do not intend to be limited to the details shown and described herein but rather intend to encompass all changes and modifications within the scope of the appended claims.

I claim:

1. A rotary fluid management device for effecting two-phase separation of fluid, comprising a rotating drum, means for providing a liquid-phase/vapor-phase fluid mixture to an inlet section of the rotating drum, first demisting screen means mounted at the inlet section of the rotating drum to rotate with the drum for removing and centrifugally separating liquid-phase fluid from the mixture as the mixture enters the rotating drum, second demisting screen means mounted at another section of the rotating drum to rotate with the drum for removing remaining liquid phase fluid from the mixture; and means for decreasing the velocity of the mixture as it passes through the second demisting screen so as to cause the mixture to contact a greater volume of the second demisting screen between an inlet side and an outlet side of the second demisting screen.

2. A rotary fluid management device according to claim 1, wherein the velocity decreasing means comprises a casing operatively associated with the second demisting screen means so as to define a cavity at the outlet side of the second demisting screen means.

3. A rotary fluid management device according to claim 2, wherein the cavity has an axial width approximately equal to an axial width of the second demisting screen means.

4. A rotary fluid management device according to claim 1, wherein the first demisting screen means comprises two adjacent multi-layer screens of equal axial width.

5. A rotary fluid management device according to claim 4, wherein the second demisting screen means is a single multi-layer screen of an axial width substantially equal to the axial width of each of the two adjacent multi-layer screens comprising the first demisting screen means.

6. A rotary fluid management device according to claim 5, wherein the velocity decreasing means comprises a casing operatively associated with the second demisting screen means so as to define a cavity at the outlet side of the second demisting screen means.

7. A rotary fluid management device according to claim 6, wherein the cavity has an axial width approximately equal to an axial width of the second demisting screen means.

8. A two-phase thermal management system, comprising at least one evaporator, condenser means and a rotary fluid management device for managing two-phase flow in the system, wherein the rotary fluid management system comprises a rotating drum, means for providing a liquid-phase/vapor-phase fluid mixture to an inlet section of the rotating drum, first demisting screen means mounted at the inlet section of the rotating drum to rotate with the drum for removing and centrifugally separating liquid-phase fluid from the mixture as the mixture enters the rotating drum, second demisting screen means mounted at another section of the rotating drum to rotate with the drum for removing remaining liquid phase fluid from the mixture; and means for decreasing the velocity of the mixture as it passes through the second demisting screen so as to cause the mixture to contact a greater volume of the second demisting screen between an inlet side and an outlet side of the second demisting screen.

9. A two-phase thermal management system according to claim 8, wherein the velocity decreasing means comprises a casing operatively associated with the second demisting screen means so as to define a cavity at the outlet side of the second demisting screen means.

10. A two-phase thermal management system according to claim 9, wherein the cavity has an axial width approximately equal to an axial width of the second demisting screen means.

11. A two-phase thermal management system according to claim 8, wherein the first demisting screen means comprises two adjacent multi-layer screens of equal axial width.

12. A two-phase thermal management system according to claim 11, wherein the second demisting screen means is a single multi-layer screen of an axial width substantially equal to the axial width of each of the two adjacent multi-layer screens comprising the first demisting screen means.

13. A two-phase thermal management system according to claim 12, wherein the velocity decreasing means comprises a casing operatively associated with the second demisting screen means so as to define a cavity at the outlet side of the second demisting screen means.

14. A two-phase thermal management system according to claim 13, wherein the cavity has an axial width approximately equal to an axial width of the second demisting screen means.

* * * * *